US006082389A

United States Patent [19]

Latham et al.

[11] Patent Number: 6,082,389

[45] Date of Patent: Jul. 4, 2000

[54] BEER FOAM REDUCING APPARATUS

[76] Inventors: Peter Latham, Latham Design Associates, 36 Harrison St., Brookline, Mass. 02146; Brendan O'Neil, 900 Snowcrest Trail, Durham, N.C. 27707; Fergus Bradley, 910 Green St., Durham, N.C. 27701

[21] Appl. No.: 09/258,350

[22] Filed: Feb. 26, 1999

Related U.S. Application Data

[60] Provisional application No. 60/025,130, Aug. 29, 1996.

[51] Int. Cl.[7] ........ F16K 31/18

[52] U.S. Cl. ........ 137/170.2; 137/181; 137/192

[58] Field of Search ........ 137/170.2, 181, 137/192

[56] References Cited

U.S. PATENT DOCUMENTS

| | | |
|---|---|---|
| 3,361,152 | 1/1968 | Akers . |
| 3,498,313 | 3/1970 | Belich . |
| 3,578,788 | 5/1971 | Potter, Jr. et al. . |
| 3,599,839 | 8/1971 | Hansen . |
| 3,776,260 | 12/1973 | Ruddick . |
| 4,212,414 | 7/1980 | Beyens . |
| 4,228,927 | 10/1980 | Beyens et al. . |
| 4,341,240 | 7/1982 | Cerrato . |
| 5,248,062 | 9/1993 | Hilliard . |
| 5,564,459 | 10/1996 | Dunne ........ 137/170.2 X |

OTHER PUBLICATIONS

Sales brochure (undated) for a Fob Detector from Metallocraft & Engineering Limited.

*Primary Examiner*—Gerald A. Michalsky
*Attorney, Agent, or Firm*—Richard C. Litman

[57] ABSTRACT

A beer foam reducing apparatus disposed for placement into the beer delivery lines between a keg and a beer serving spout to prevent pressurized carbon dioxide from entering the delivery line between the apparatus and the serving spout when a keg empties of beer. The apparatus comprises a base with a shallow receptacle disposed to receive an inverted, clear plastic container for sealed, threaded engagement. The plastic container is easily removed for cleaning or replacement and easily sealed for operation. The apparatus also comprises an inlet and outlet in the base, a float disposed for releasably sealing the outlet of the base when a keg empties, and a flow control column secured in the base and extending upwards into the inverted container. Single handed manipulation of a handle leveraged against a mounting bracket regulates operation of the flow control column, and specifically the venting of pressurized carbon dioxide and releasing of the float to begin delivery of beer through the outlet.

15 Claims, 6 Drawing Sheets

BEER FOAM REDUCING APPARATUS

This application claims the benefit of U.S. provisional application Ser. No. 60/025,130, filed Aug. 29, 1996.

BACKGROUND OF THE INVENTION

1. Field of the Invention

The present invention relates to beer dispensing apparatus, and more particularly to a foam reducing apparatus disposed for insertion into commercial beer dispensing systems. Even more particularly, the present invention relates to a foam reducing apparatus disposed for insertion into the beer delivery lines between the keg and the serving spout.

2. Description of the Prior Art

Conventional commercial beer delivery systems utilize a pressurized carbon dioxide source to deliver beer from the keg to the serving spout. Typically, the keg cooler is located in the basement of a building, whereas the serving spouts for beer are located upstairs at one or more bars. Typically, the beer delivery lines may be anywhere from approximately 10 feet to 100 or more feet long. Depending on the length of the delivery line, the delivery lines may contain up to three to five pints of beer.

Using the conventional beer delivery system, as described above, pressurized carbon dioxide is oftentimes forced into the delivery lines when the keg empties. This pressurized carbon dioxide is the cause of substantial foaming when the keg nears its emptying point. When the pressurized carbon dioxide enters the beer delivery lines, the contents of the lines usually must be discarded because the substantial foaming renders the beer undesirable. Over time, the wasting of up to three to five pints of beer per keg may results in significant lost profits.

To overcome this problem with traditional commercial kegging systems, one piece of prior art discloses a “foam on beer”, or FOB detector. The FOB detector, manufactured by Metallocraft & Engineering Limited, appears in an sales brochure. The FOB detector shown in the sales brochure comprises a beer chamber which has an inlet for receiving the beer supply from a keg, an outlet for discharging beer to a tap, and a floating member to close the outlet. While beer flows through the FOB detector, the float remains in its buoyant position to allow beer to flow from the outlet. When pressurized carbon dioxide and foam enter the container, the float drops and seals the outlet closed to prevent pressurized carbon dioxide from entering the beer delivery line. The FOB detector also comprises a first handle that operates a cam to control the position of the floating member, as well as a second handle that controls the opening and closing of an air vent. The FOB detector comprises a pair of casing members that screw onto and seal the opposed ends of the beer chamber.

The Metallocraft & Engineering Limited FOB detector, however, requires two handed operation to re-establish the flow of beer through the delivery line. To accomplish the task, a user must manipulate a first handle with one hand to allow gas to bleed from the FOB detector when a new keg is tapped, and then manipulate a second handle with the other hand to effect the cam and the position of the float. In addition, because the casing members are located on either end of the device, the Metallocraft & Engineering Limited FOB detector is much more difficult to disassemble for cleaning or replacement of parts.

None of the above inventions and patents, taken either singly or in combination, is seen to describe the instant invention as claimed.

SUMMARY OF THE INVENTION

The beer foam reducing apparatus of the present invention is disposed for placement into the beer delivery lines between a keg with its pressurized carbon dioxide source, and a beer serving spout. The present invention operates to close the outlet to the delivery line when the flow of beer from the keg stops and pressurized carbon dioxide enters the apparatus. By closing the outlet, the present invention protects beer already in the delivery line from foaming, which would require the beer to be discarded. The beer foam reducing apparatus prevents the wasting of beer in the delivery lines, which over time results in substantial savings.

The beer foam reducing apparatus of the present invention comprises a base with a shallow receptacle disposed to receive an inverted, clear plastic container for sealed, threaded engagement. The plastic container is easily removed for cleaning or replacement and easily sealed for operation. The apparatus also comprises an inlet and outlet in the base, a float disposed for releasably sealing the outlet of the base when a keg empties, and a flow control column secured in the base and extending upwards into the inverted container. Single handed manipulation of a handle leveraged against a mounting bracket regulates operation of the flow control column, and specifically the venting of pressurized carbon dioxide and releasing of the float to open the outlet for renewed delivery of beer.

Accordingly, it is a principal object of the invention to provide a beer foam reducing apparatus that eliminates the flow of pressurized carbon dioxide gas through delivery lines when a keg empties, and thereby provides substantial savings by eliminating the discard of beer.

It is another object of the invention to provide a beer foam reducing apparatus that is easy to use and requires only single handed operation.

It is a further object of the invention to provide a beer foam reducing apparatus that is easy to assemble and disassemble for cleaning and whose parts are easily replaced if necessary.

Still another object of the invention is to provide a beer foam reducing apparatus that is simple to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
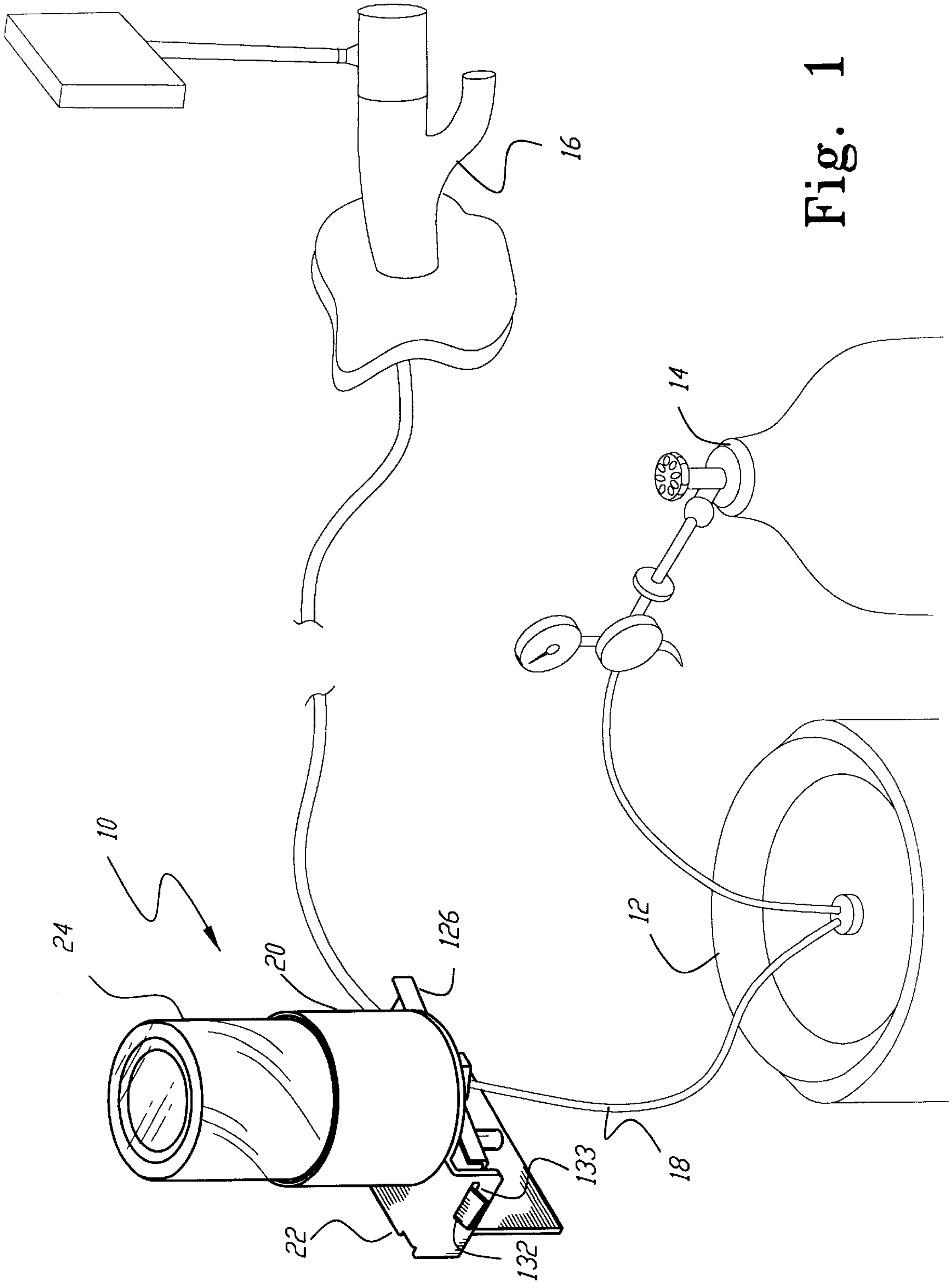
FIG. 1 is an environmental view of the beer foam reducing apparatus as it is placed in a conventional beer delivery system that utilizes a pressurized carbon dioxide source to deliver beer from the keg to the serving spout.

Referring now to the figures by numerals of reference and first to FIG. 1, 10 denotes generally a beer foam reducing apparatus of the present invention. The beer foam reducing apparatus 10 is disposed for use with a conventional beer delivery system which comprises a keg 12 and a pressurized carbon dioxide source 14 for supplying the beer to a serving spout 16. The apparatus 10 should be installed intermediate the keg and tap, with a delivery line 18 carrying beer to the inlet of the apparatus and a delivery line 18' carrying beer from the outlet of the apparatus to the serving spout 16. Because of the nature of the apparatus 10, it should be placed in closer proximity to the keg 14 than the serving spout 16. For example, the beer foam reducing apparatus 10 may be mounted to the interior wall of a keg cooler, with delivery line 18 extending several feet from the keg to the apparatus and delivery line 18' extending up to 100 or more feet to the serving spout 16 located in the bar.

Figure 2:
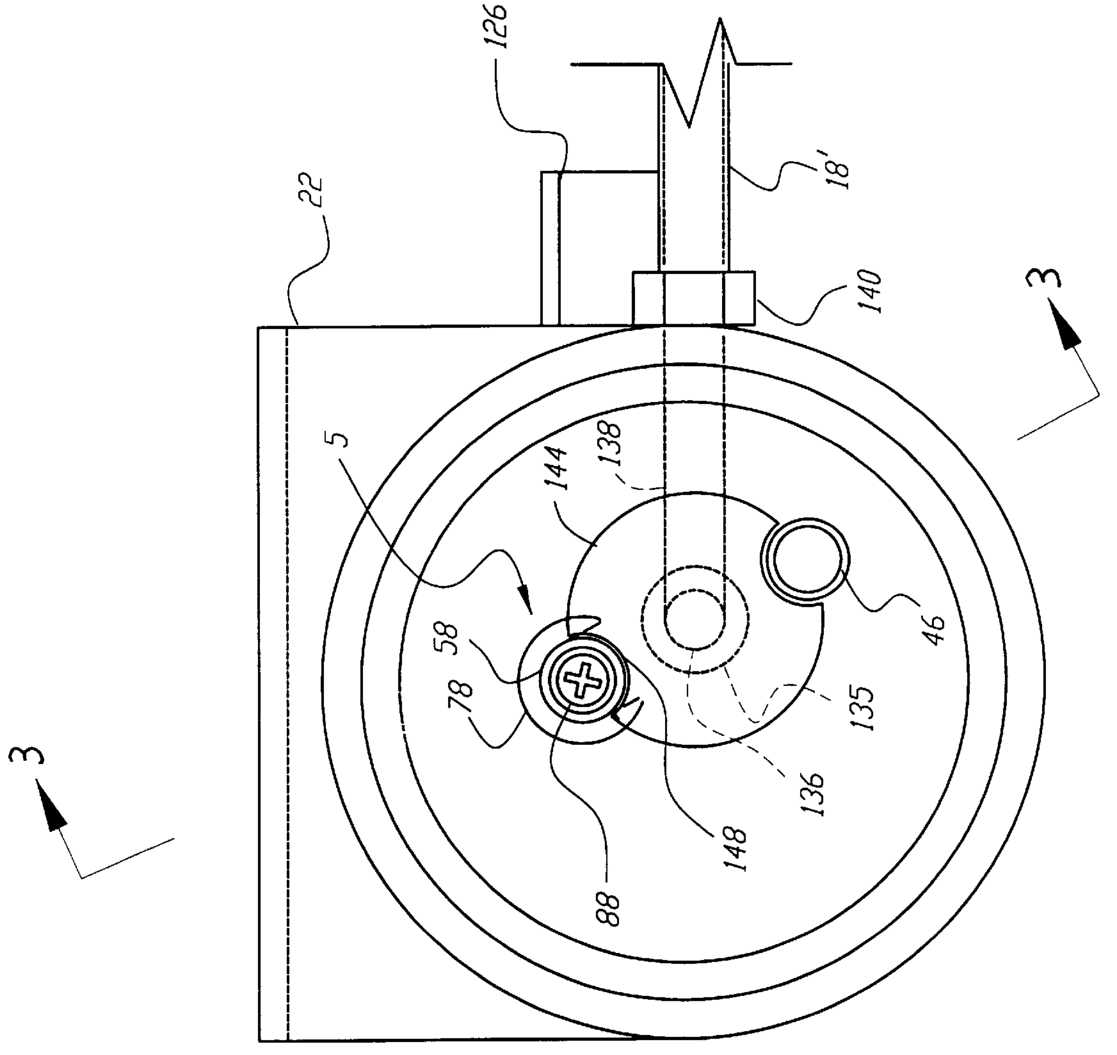
FIG. 2 is a top plan view of the beer foam reducing device.
Figure 3:
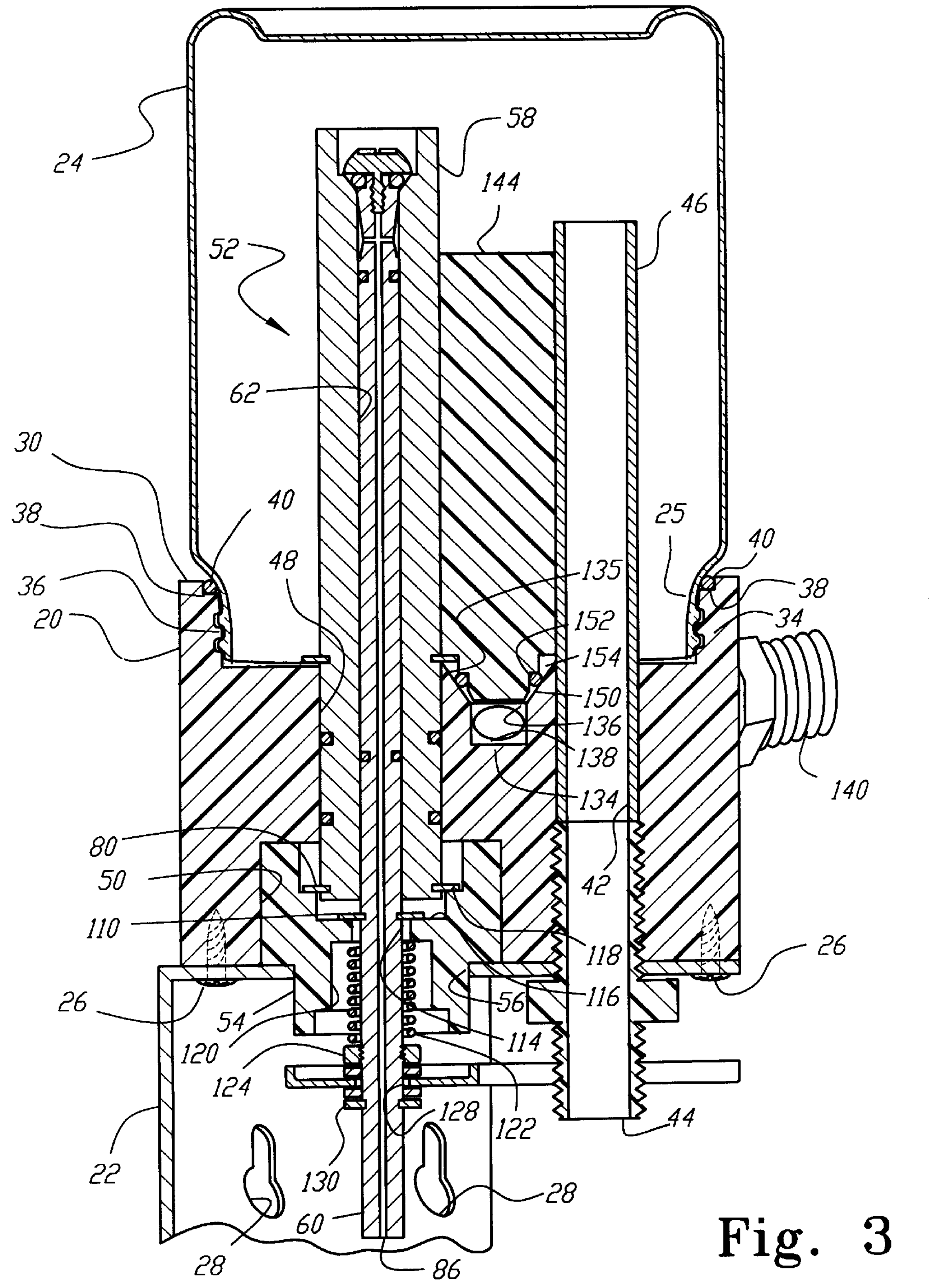
FIG. 3 is a cross sectional view according to line 3—3 in FIG. 2, with the handle shown in the lowest position and the flow control column in a position for maintaining closure of the outlet by the float, and with the vent closed.

Referring now to FIGS. 2 and 3, the beer foam reducing apparatus 10 generally comprises a base 20 secured to a mounting bracket 22 and disposed to receive a container 24. The base 20 preferably is formed from an acetyl plastic material which is both durable and relatively lightweight. The container 24 is formed of a clear plastic material and is disposed to engage the base 20 with its externally threaded neck 25. Mounting bracket 22 is formed of stainless steel and is generally L-shaped. One portion of the mounting bracket 22 is secured to the lower surface of base 20 with a plurality of screws 26, while the other portion is disposed for mounting against a wall. A pair of openings 28 are provided for screwing or otherwise anchoring the mounting bracket 22 to a wall.

It should be noted that the apparatus 10 operates in part on the principle of gravity, and for that reason the apparatus has a definite orientation. Thus, the mounting bracket 22 must be secured to a wall or other surface so that the container 24 is oriented directly above or upwardly from the base 20, and in an inverted position.

Base 20 has a generally cylindrical construction, and at its upper end 30 a generally cylindrical, axially positioned recess 32 is formed. Recess 32 is surrounded by an annular collar 34 whose inner diameter has a series of threads 36 disposed to receive the threaded neck 25 of container 24. A shoulder 38 is provided where the inner diameter of annular collar 34 meets the upper end 30 of the base. An O-ring 40 of sufficient gauge, which is either placed into shoulder 38 or placed around neck 25, is disposed to provide a sealed engagement between base 20 and container 24. Although not shown, it should be apparent to one skilled in the art that rather than using O-ring 40, a gasket alternatively could be placed in recess 32 to seal the same encasement at the mouth of the container 24.

Base 20 has a radially displaced bore 42 that extends longitudinally therethrough. The lower end of bore 42 is provided with a threaded inner diameter that is disposed to receive the threaded fitting 44, which effectively seals bore 42 from any leakage. Fitting 44 may be any conventional pipe fitting having an appropriate diameter, however, the fitting 44 shown at FIG. 2 is a double-end joint with male threads on each end. Fitting 44 simply provides a means for connecting the beer delivery line 18 to the apparatus 10. The upper end of bore 42 is generally cylindrical and is disposed to receive an inlet conduit 46, which carries the beer into the container 24. Inlet conduit 46 preferably is a stainless steel tube having an outer diameter slightly smaller than the diameter of bore 42 so that the conduit fits snugly therein, yet may also easily be removed.

A second radially displaced bore 48 also extends longitudinally through the base 20. Extending into the lower end of base 20 and communicating with bore 48 is a coaxial counterbore 50 that has a substantially wider diameter than the bore 48. Bore 48 is disposed to receive a flow control column, generally denoted as 52. Because the flow control column 52 is adequately sealed within bore 48, as discussed hereinafter, the counterbore 50 receives the support member 54 without any seals therebetween. During assembly, the support member is placed into counterbore 50 before the mounting bracket 22 is secured to the lower end of base 20. Support member 54 has a broader cylindrical end that is disposed for placement into counterbore 50, and a reduced diameter end which is disposed to project through an opening 56 in the mounting bracket 22.

Figure 6:
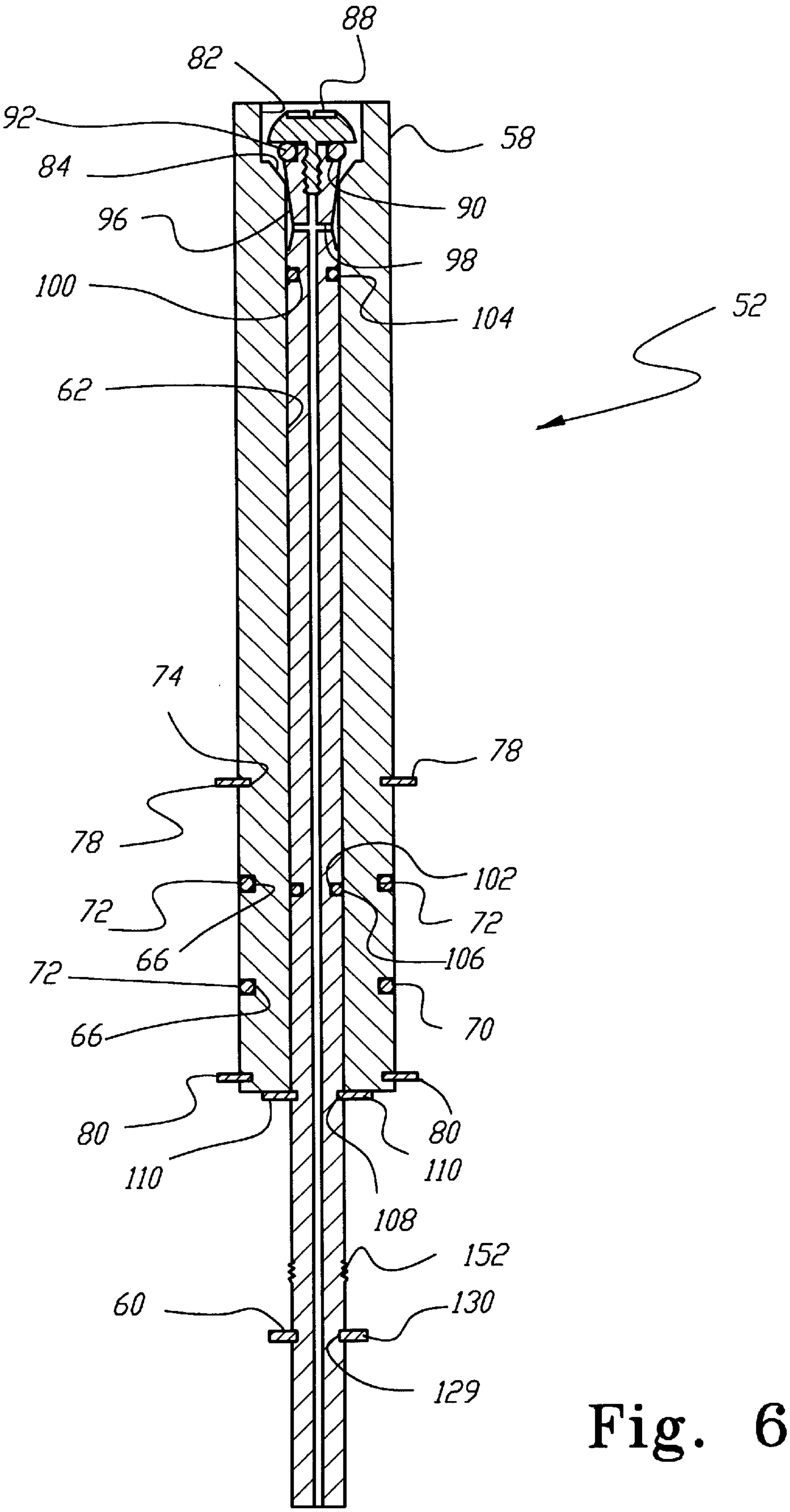
FIG. 6 is a cross sectional view of the flow control column removed from the remainder of the beer foam control apparatus, and shown as at FIG. 4 with the inner cylinder elevated to open the vent.

Referring now to FIGS. 3 and 6, the low control column 52 comprises a generally cylindrical outer barrel 58 and an inner cylinder 60 that is disposed for sliding motion within a cylindrical bore 62 of outer barrel 58. Both the outer barrel 58 and the inner cylinder 60 are formed of stainless steel. The outer barrel 58 is provided with a pair of annular recesses 66 and 68 in its outer diameter which retain a pair of resilient O-rings 70 and 72, respectively. The recesses 66 and 68 are located on the portion of outer barrel 58 which is placed into bore 48, and the O-rings 70 and 72 effectively seal bore 48 to prevent any leakage of beer or pressurized carbon dioxide from the container 24. A pair of annular grooves 74 and 76 are also provided in the outer diameter of the barrel 58, and each groove is disposed to receive a removable retaining ring 78 and 80, respectively. It should be noted that all retaining rings disclosed herein may be of any conventional design, however, for ease of assembly, cleaning, and repairs, it is preferable to utilize retaining rings that are removable by way of their broken circumference. Regardless of the type of retaining rings used, the upper retaining ring 78 limits downward movement of the outer barrel 58 and the lower retaining ring 80 limits upward movement of the outer barrel, as discussed hereinafter.

At its upper end, the outer barrel 58 has an axial counterbore 82 that communicates with bore 62 via a tapered counterbore 84. As discussed hereinafter, the counterbores 82 and 84 accommodate the upper end of inner cylinder 60. Inner cylinder 60 comprises a stainless steel shaft with an axial bore 86 that extends the length of the shaft. The inner cylinder 60 is provided with a pair of annular recesses 100 and 102 in its outer diameter which retain a pair of resilient O-rings 104 and 106, respectively. The recesses 100 and 102 are located on the portion of inner cylinder 60 which is placed into bore 62, and the O-rings 104 and 106 effectively seal bore 62 to prevent any leakage of beer or pressurized carbon dioxide from the container 24. The upper end of bore 86 is provided with threads along its inner diameter which are disposed to receive the threaded end of a machine screw 88 or the like, thereby sealing closed the upper end of bore 86. The upper end of inner cylinder 60 has an annular shoulder 90 that receives a resilient O-ring 92. With screw 88 tightened into the upper end of bore 86 the O-ring 92 is deformed slightly, and while inner cylinder 60 is in the position shown at FIG. 3, the O-ring 92 seals against the tapered counterbore 84 to prevent the inner cylinder from allowing the flow of pressurized carbon dioxide through bore 86.

Figure 4:
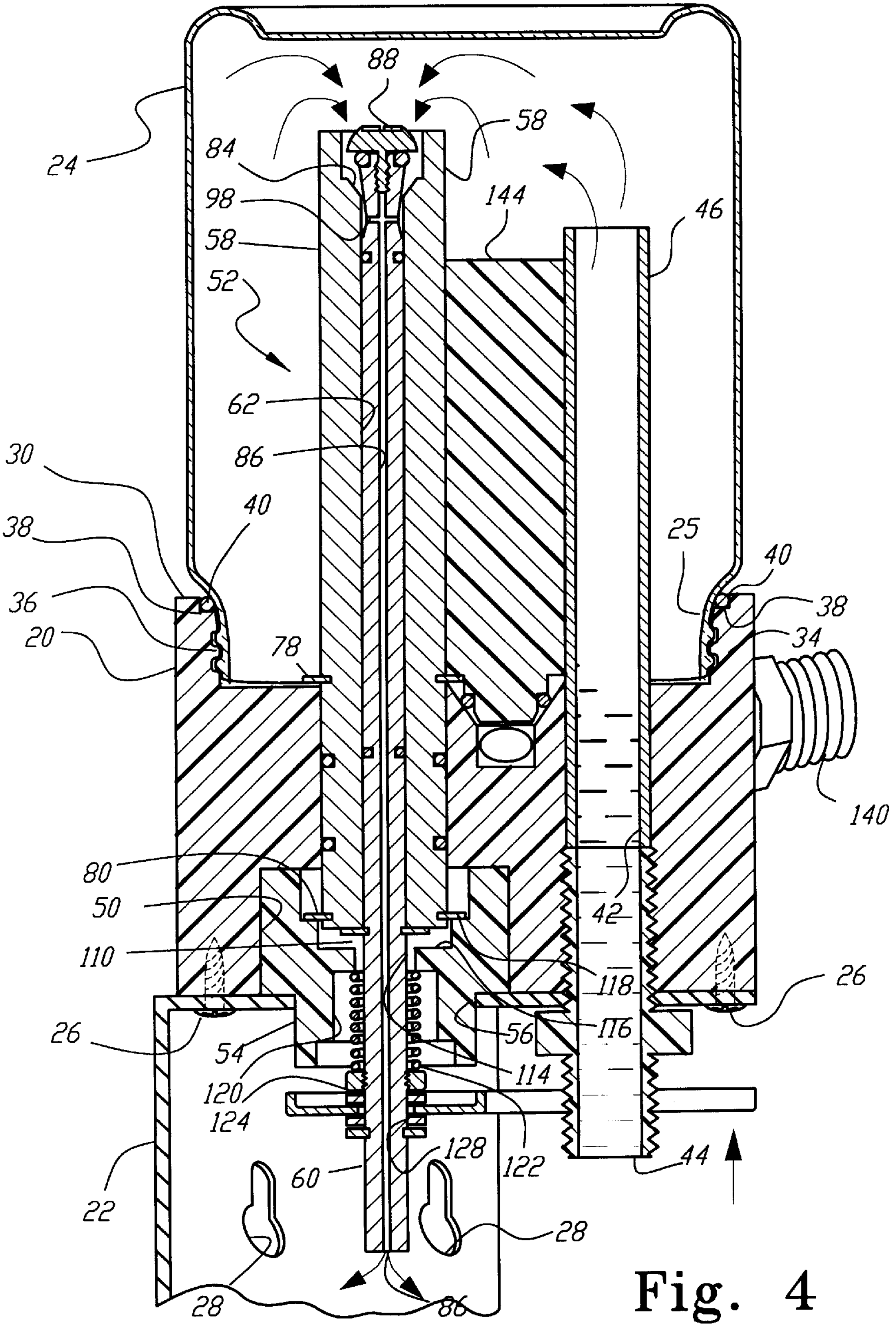
FIG. 4 is a cross sectional view as in FIG. 3, however, the handle is shown in a partially raised position following tapping of a new keg, whereby the inner cylinder in the flow control column is slightly elevated to open the vent and allow pressurized carbon dioxide to escape.
Figure 5:
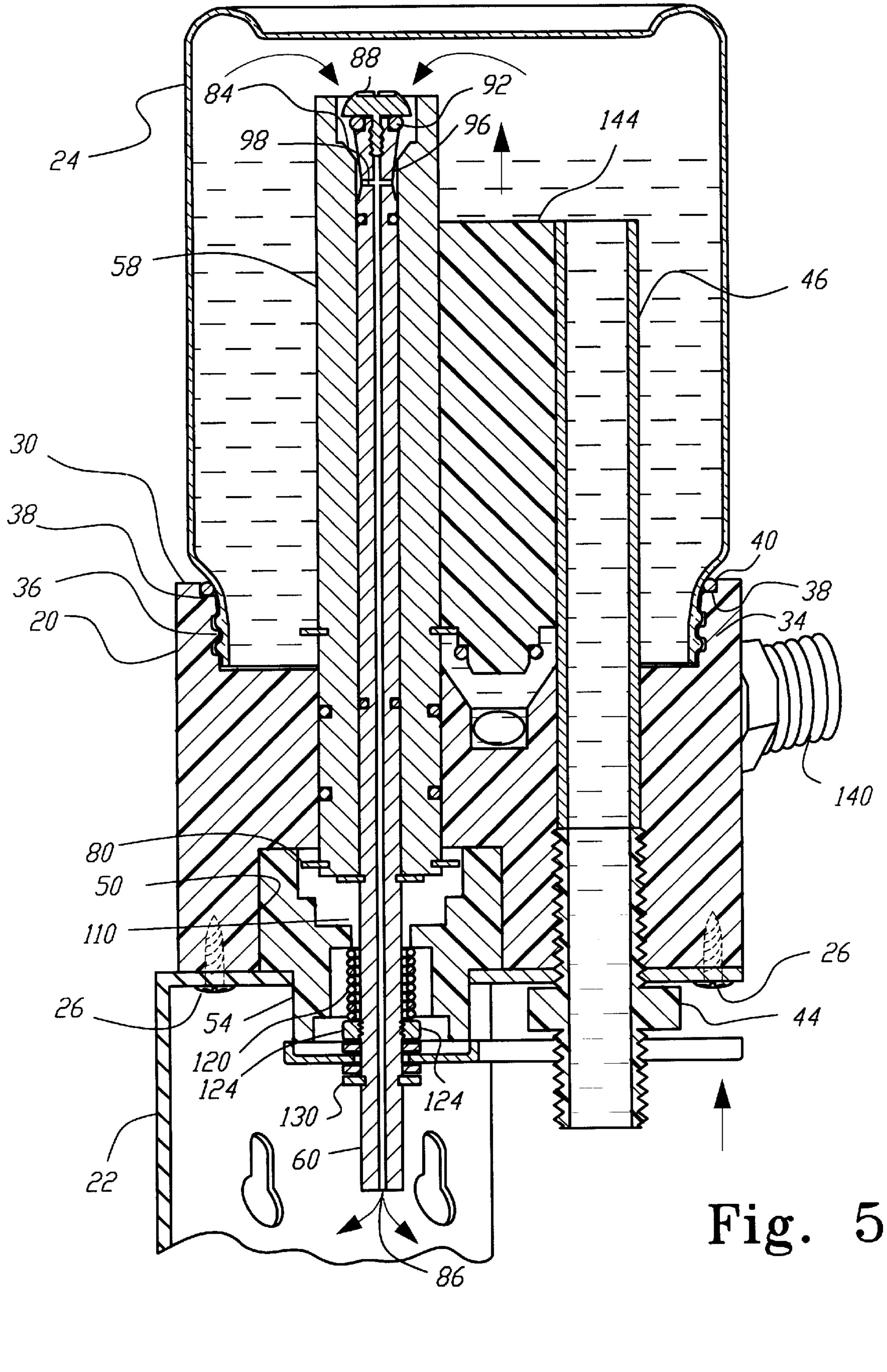
FIG. 5 is a cross sectional view as in FIG. 3, however, the handle is shown in its fully raised position following tapping of a new keg, whereby the flow control column is elevated to cause the retaining ring on the outer barrel to break the seal of the float at the outlet for resuming beer flow through the delivery lines.

To allow for selective flow of pressurized carbon dioxide through the bore 86, inner cylinder 60 is provided with a tapered diameter portion 96 adjacent it upper end. At the point where its diameter is narrowest, the inner cylinder 60 has a diametral passageway 98 that extends radially through inner cylinder 60 and communicates with the axial bore 86. When inner cylinder 60 is elevated within the bore 62 of outer barrel 58, as shown at FIG. 4, the seal between O-ring 92 and the tapered counterbore 84 of the outer barrel is broken. This allows pressurized carbon dioxide (represented by the paired arrows in FIG. 4) to flow around the head of screw 88, between the tapered diameter portion 96 and the bore 62 of outer barrel, through diametral passageway 98, and into axial bore 86 for discharge from the lower end of inner cylinder 60. To limit the upward movement of the inner cylinder 60, the inner cylinder is provided with an annular groove 108 that is disposed to receive a removable retaining ring 110. The retaining ring 110 contacts the lower end of the outer barrel 58, as shown at FIGS. 4 and 5, to halt upward movement. Where retaining ring 110 halts upward movement of inner cylinder 60, there is sufficient clearance between the inner cylinder and the outer barrel to allow for release of pressurized gas through bore 86.

Support member 54, which snugly fits into the counterbore 50, has a central, axial opening 114 that loosely receives the inner cylinder 60 for axial movement therethrough. The upper or innermost end of support member 54 has a pair of stepped, coaxial recesses 116 and 118 that have a sufficient diameter to accommodate retaining rings 110 and 80, respectively. Recess 118 specifically limit downward movement of the outer barrel 58, and recess 116 specifically limits downward movement of the inner cylinder 60. When retaining ring 110 rests within recess 116, no pressurized carbon dioxide may escape through the above-described ventilation passages of the ventilation cylinder 60 because the O-ring 92 is sealed against the tapered counterbore 84 of the outer barrel 58. The lower or outermost end of support member 54, which extends through the opening 56 of mounting bracket 22, also has a coaxial, expanded diameter recess 120. A coil spring 122, fitted around the inner cylinder 60 and loosely received in recess 120, resiliently urges the inner cylinder to its downward limit by acting upon the threaded nut 124 which is secured to a threaded portion 125 of the inner cylinder outer diameter.

A handle 126 is provided for selectively manipulating the flow control column 52. The handle 126 has an opening 128 that is disposed to accommodate the lower end of inner cylinder 60. The lower end of the inner cylinder is provided with an annular groove 129 that is disposed to receive a removable retaining ring 130. The retaining ring 130 prevents handle 126 from disengaging the lower end of inner cylinder 60. As shown at FIG. 1, handle 126 is provided with a tongue 132 which upon assembly of the beer foam reducing apparatus 10 is inserted through a slot 133 formed in the side of the mounting bracket 22. Slot 133 provides handle 126 with its fulcrum point for leverage to operate the flow control column 52. As discussed hereinafter, manual lifting of handle 126 allows a user to manipulate inner cylinder 60 and outer barrel 58 by acting against the force of spring 122.

An outlet generally denoted as 134 is provided for discharging the beer from container 24 to the serving spout 16 at a remote location. The outlet 134 is located between the flow control column 52 and the inlet conduit 46 at a radially displaced position. The outlet 134 comprises a tapered bore 135 that communicates at its upper end with the interior of container 24 (as defined by the recess 32) and communicates at its lower end with a shallow, generally cylindrical bore 136. The bore 136 communicates with an off-centerline passageway 138 that extends laterally between bore 136 and the outer wall of base 20. The outer end of passageway 138 may be threaded and equipped with an appropriate fitting 140 for coupling to a conventional delivery hose 18'.

A float 144 is provided for releasably sealing outlet 134 to prevent pressurized carbon dioxide gas and beer foam from entering delivery line 18'. The float 144 preferably is manufactured from polypropylene or another similar plastic material that will allow the float to be buoyant in even the lowest specific gravity beers. The float has a generally cylindrical shape, however, to maintain the float aligned with outlet 134 the outer periphery of the float is provided with a pair of opposed, longitudinal and arcuate recesses 146 and 148 that accommodate the inlet conduit 46 and flow control column 52, respectively. The recesses 146 and 148 allow the float to rise and fall, as necessary, but without moving away from its alignment with the outlet 134. At its lower end, float 144 has a reduced diameter neck 150 that extends into the tapered bore 135 when float 144 is fully depressed to close outlet 134. Neck 150 is provided with an annular shoulder 152 that accommodates a resilient O-ring 154 of suitable gauge. When float 144 is fully depressed, the O-ring 154 engages the sidewalls of the tapered bore 135 effectively to seal closed the outlet 134. Even when sealing closed the outlet 134, a portion of float 144 overlies a portion of the retaining ring 80. As discussed hereinafter, the retaining ring 80 may be used to elevate the float and break the seal of O-ring 154 to resume flow of beer through outlet 134 and into delivery tube 18'.

To assemble the beer foam reducing apparatus 10, a complete flow control column 52 should have its retaining ring 80 removed so that the entire flow control column may be inserted upwardly through bore 48 before the retaining ring 80 is replaced. With the flow control column properly placed, the support member 54 should then be positioned in counterbore 50 and mounting bracket 22 placed over the lower end of base 20 so that the lower end of support member 54 passes through opening 56 in the mounting bracket. The mounting bracket 22 may be secured to the base 20 by a plurality of screws 26. Next, spring 122 and nut 124 are inserted over the lower end of inner cylinder 60 and nut 124 threadably retains sprint 122 in the shown position. Following the nut 124 is a conventional washer, then handle 126 and another washer. The entire compliment of materials placed onto the lower end of inner cylinder 60 is maintained in position by a final removable retaining ring 130. However, before handle 126 is placed onto the lower end of inner cylinder 60, the tongue 132 should first be placed into the slot 133 provided on mounting bracket 22. Next the threaded fittings 44 and 140 should be inserted into base 20, and inlet conduct 46 and float 144 properly positioned before screwing the threaded neck 25 of container 24 into the recess 32 defined by the threaded annular collar 34.

With the beer foam reducing apparatus 10 assembled, a user may mount the apparatus in a keg cooler, for example, using a pair of screws or wall anchors (not shown) that engage mounting bracket 22 by the openings 28. Delivery tubes 18 and 18' may be connected to the threaded fittings 44 and 140, respectively, and the keg with its pressurized carbon dioxide source may be tapped for delivering beer into the apparatus through delivery line 18.

In use, the float 144 will begin in its lowermost position whereby the outlet 132 is sealed closed to prevent pressurized carbon dioxide gas from flowing through delivery line 18'. Following tapping of the keg, a user will lift the handle 126 (as indicated by the single arrow in FIG. 4) to force the inner cylinder 60 to elevate by the action of handle 126 against the fixed nut 124. This causes the inner cylinder to elevate against the resistance of spring 122 until the retaining ring 110 contacts the lower end of outer barrel 58, as shown in FIG. 4. When the retaining ring reaches the position shown in FIG. 4, the inner cylinder will have been elevated a distance sufficient to allow pressurized carbon dioxide (represented by the paired arrows) to flow around screw 88, between the tapered diameter portion 96 and the bore 62 of outer barrel, through diametral bore 98, and into axial bore 86 for discharge through the lower end of the inner cylinder.

Almost immediately following the venting of pressurized carbon dioxide, beer will begin to flow into container 24 through the inlet conduit 46. However, without elevating float 144 beer will escape through the vent of flow control column 52 rather than through the outlet 134. To begin delivery of beer through the outlet 134 and eventually to the serving spout 16, the user must continue to raise handle 126. When handle 126 is raised further, as shown at FIG. 5, the action of handle 126 against the nut 124 causes continued elevation of inner cylinder 60 which, due to the contact of retaining ring 110 against the lower end of the outer barrel 58, results in the elevation of the entire flow control column 52. When the flow control column 52 rises, retaining ring 78 lifts the float 144 to break the seal of O-ring 154. When the seal of O-ring 154 is broken the float 144 may rise upwardly (as indicated by a single arrow in FIG. 5) to float on the continuous supply of beer entering the container 24. Once float 144 is elevated, the user may let go of handle 126 and allow the spring 122 to urge the entire flow control column 52 into its original position, shown at FIG. 3. Although the flow control column 52 returns to its original position, float 144 remains above outlet 134 until the supply of beer ceases.

Flow of beer through the beer foam reducing apparatus 10 will continue until the keg empties of beer and begins spewing pressurized carbon dioxide and beer foam into container 24. When the liquid level drops into the outlet 134, the float 144 falls and the pressure of carbon dioxide causes the O-ring 154 on the float to seal against the tapered bore 135. Once outlet 134 is sealed and the flow of beer through delivery line 18' has stopped, a new keg may be tapped and the process repeated.

It is to be understood that the present invention is not limited to the sole embodiment described above, but encompasses any and all embodiments within the scope of the following claims.

We claim:

1. A beer foam reducing apparatus of the type to be used in connection with a keg coupled to a pressurized carbon dioxide source for supplying the liquid contents of the keg to a remote serving spout, the apparatus comprising:

a base member having an upper side and a lower side, said base member having an inlet for receiving the liquid and an outlet for discharging the liquid;

a container having means for removably securing said container to said upper side of said base member for sealed fluid and vapor communication with said inlet and said outlet;

outlet closure means for sealing closed said outlet when the supply of liquid from the keg ceases;

venting means for venting the pressurized gas from said container, said venting means being slidable between a normally closed position and an open position;

outlet opening means for opening said outlet following closure of said outlet by said outlet closure means; and biased lifting means connected to said venting means and operable to slide said venting means and to effect said outlet opening means.

2. The beer foam reducing apparatus according to claim 1, wherein said upper side of said base has an annular collar defining a recess and said annular collar has a first plurality of threads on the interior of said annular collar, said means for removably securing said container to said upper side of said base member comprises a second plurality of threads on a neck of said container, and said first plurality of threads is disposed to engage said second plurality of threads upon insertion of said container into said recess.

3. The beer foam reducing apparatus according to claim 2, further comprising container sealing means for sealing said container in said recess of said base.

4. The beer foam reducing apparatus according to claim 1, wherein said biased lifting means is operable sequentially to slide said venting means into said open position, then to effect said outlet opening means.

5. The beer foam reducing apparatus according to claim 4, wherein said base has a bore extending therethrough, said venting means comprises:

an outer member seated in said first bore, said outer member having an upper end and a lower end, and a second bore extending longitudinally through said outer member between said lower end and said upper end thereof;

first sealing means for sealing said outer member in said first bore;

an inner member slidably seated in said second bore, said inner member having an upper end and a lower end, said inner member having a first passageway extending longitudinally into said inner member from said lower end thereof and communicating with a second passageway extending laterally into said inner member adjacent said upper end thereof;

second sealing means for sealing said inner member in said second bore;

adjustable sealing means for sealing said upper end of said inner member and said upper end of said outer member; and wherein said biased lifting means is secured to said lower end of said inner member, said biased lifting means is manipulable for movement between a first position where said venting means remains in said closed position, whereby said adjustable sealing means is closed to prevent the venting of pressurized gas, and a second position where said biased lifting member elevates said inner member upwardly within said outer member for sliding said venting means into said open position, whereby said adjustable sealing means is opened to allow the venting of pressurized gas.

6. The beer foam reducing apparatus according to claim 5, wherein said adjustable sealing means is secured to said inner member.

7. The beer foam reducing apparatus according to claim 6, wherein said first passageway extends longitudinally through said inner member between said lower end and said upper end thereof, said adjustable sealing means comprise:

third sealing means for sealing said upper end of said inner member and said upper end of said outer member; and retaining means removably secured within said first passageway for sealing said first passageway and retaining said third sealing means in contact with said upper end of said inner member.

8. The beer foam reducing apparatus according to claim 5, wherein said outer member is slidably seated in said first bore, said outlet opening means comprises:

first contact means secured to said inner member for contacting said outer member;

second contact means secured to said outer member for contacting said outlet closure means;

wherein said biased lifting means is manipulable for movement between said second position, where said first contact means contacts said lower end of said outer member, and a third position where said first contact means urges said outer member to slide upwardly, whereby said second contact means urges said outlet closure means to move upwardly away from said outlet.

9. The beer foam reducing apparatus according to claim 1, wherein said outlet closure means comprises:

a buoyant body having a lower end with outlet sealing means on said lower end thereof; and aligning means for maintaining said buoyant body in alignment with said outlet.

10. The beer foam reducing apparatus according to claim 9, wherein said buoyant body has a pair of arcuate, longitudinal grooves formed in opposed sides of said buoyant body, said aligning means comprise:

a first cylindrical member secured in said base and projecting perpendicularly upwardly therefrom; and a second cylindrical member secured in said base and projecting perpendicularly upwardly therefrom.

11. The beer foam reducing apparatus according to claim 1, further comprising a mounting bracket secured to said base, said mounting bracket having at least one opening therethrough for securing the apparatus to a vertical surface.

12. The beer foam reducing apparatus according to claim 11, wherein said mounting bracket has a side wall with an opening in said side wall, said biased lifting means comprise:

a handle having a tongue on one end thereof for placement through said opening in said sidewall to provide leverage for operable movement of said handle; and a spring positioned between said base and said handle to bias said handle into a position wherein said venting means is maintained in said closed position.

13. A beer foam reducing apparatus of the type to be used in connection with a keg coupled to a pressurized carbon dioxide source tor supplying the liquid contents of the keg to a remote serving spout, the apparatus comprising:

a base member having an upper side and a lower side, said base member having a first bore extending through said base member between said upper side and said lower side, and said base member having an inlet for receiving the liquid and an outlet for discharging the liquid;

a container having means for removably securing said container to said upper side of said base member for sealed fluid and vapor communication with said inlet and said outlet;

outlet closure means for sealing closed said outlet when the supply of liquid from the keg ceases; and a flow control column slidably seated within said first bore, said flow control column having first sealing means for sealing said flow control column in said first bore, said flow control column having adjustable venting means for venting the pressurized gas from said container and outlet opening means for opening said outlet following closure of said outlet by said outlet closure means; and biased lifting means connected to said flow control column and operable to slide said flow control column to effect said adjustable venting means and said outlet opening means.

14. The beer foam reducing apparatus according to claim 13, wherein said flow control column comprises an outer member slidably seated within said first bore, said outer member having an upper end and a lower end, said outer member having a second bore extending between said lower end and said upper end thereof, said venting means comprise:

an inner member slidably seated in said second bore for movement between a first position and a second position, said inner member having an upper end and a lower end, said inner member having second sealing means for sealing said inner member in said second bore, said inner member having a first passageway extending from said lower end thereof and communicating with a second passageway extending laterally into said inner member adjacent said upper end thereof;

adjustable vent sealing means secured to said upper end of said inner member for sealing said upper end of said inner member and said upper end of said outer member; and wherein said biased lifting means is secured to said lower end of said inner member, said biased lifting means is manipulable for sliding said inner member between said first position, where said adjustable vent sealing means prevents venting of the pressurized gas through said first and second passageways, and said second position, where said adjustable vent sealing means allows venting of pressurized gas through said first and second passageways.

15. The beer foam reducing apparatus according to claim 14, wherein said outlet opening means comprise:

first contact means secured to said inner member for contacting said outer member;

second contact means secured to said outer member for contacting said outlet closure means;

wherein said biased lifting means is manipulable for sliding said inner member between said second position, where said first contact means contacts said lower end of said outer member, and a third position, where said first contact member urges said outer member to slide upwardly, whereby said second contact member contacts said outlet closure means and urges said outlet closure means to move upwardly away from said outlet.

* * * * *